(No Model.)

W. BADGER.
BALL BEARING.

No. 527,041. Patented Oct. 9, 1894.

Witnesses:
E. B. Bolton
E. K. Sturtevant

Inventor:
Wildsmith Badger
By Richard
his Attorneys

UNITED STATES PATENT OFFICE.

WILDSMITH BADGER, OF LONDON, ENGLAND.

BALL-BEARING.

SPECIFICATION forming part of Letters Patent No. 527,041, dated October 9, 1894.

Application filed April 16, 1894. Serial No. 507,735. (No model.)

*To all whom it may concern:*

Be it known that I, WILDSMITH BADGER, mechanical engineer, a subject of Her Majesty the Queen of Great Britain and Ireland, residing at 12 Wilton Square, New North Road, London, in the county of Middlesex, England, have invented certain Improvements in Ball-Bearings, of which the following is a specification.

This invention relates to that class of ball bearing wherein a plurality of rows of balls is employed, and has for its chief object to facilitate the quick assembling, adjustment, and taking apart of such bearings.

According to my invention each row of balls is separated from the adjacent row by an adjustable ring or ball race formed with a screw thread upon its periphery which engages with a corresponding thread formed around the interior of the outer casing or casting of the bearing. These rings or ball races may be of the form usually employed in ball bearings with side adjustment. Since in assembling the bearing it would be a long and tedious operation, especially when a large number of rows of balls was employed, to gradually screw each ring or race along its threaded path to its proper position I interrupt the screw thread of the ball races at suitable intervals and correspondingly interrupt the screw thread of the casing. This enables each ball race to be quickly slipped along the casing to its proper place in the bearing where a partial turn will cause its screw thread to interlock with that of the casing. The taking apart of the bearing is equally facilitated. Furthermore the angles caused by the interruptions on the ball races form a convenient "bite" or "hold" for a chisel, punch, or other handy tool when adjusting the bearing to proper working fit, the outer casing being divided longitudinally and the two portions detachably connected so as to permit ready access to the edge of any ball race or ring for this purpose. I prefer to form the said longitudinal division in the outer casing considerably above, below, or to one or other side of, the center line thereof, since by this arrangement the various rings will be firmly held in position when the cover or cap of the casing is removed. There should also be sufficient "draw" between the two portions of the casing to firmly grip and lock the ball races when screwed together. In order to permit the balls to be readily inserted in and withdrawn from their races I form a shallow groove or notch in the edge of each ball race.

Suitable glands or caps would be provided at each end of the bearing to retain the oil therein.

Figure 1:
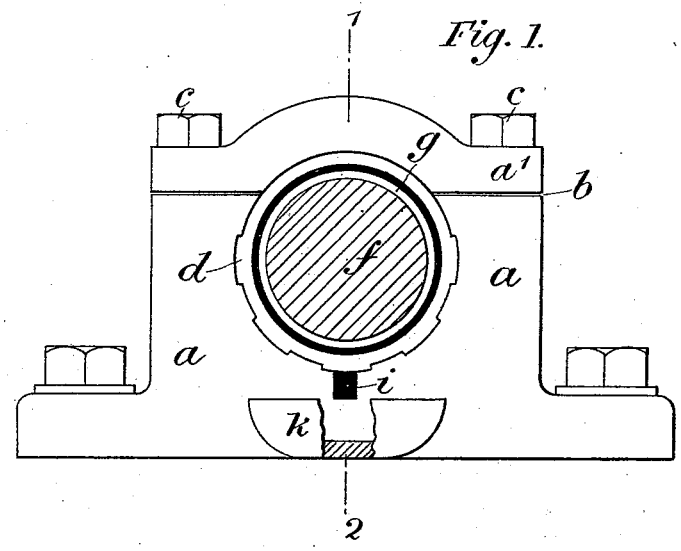
Figure 2:
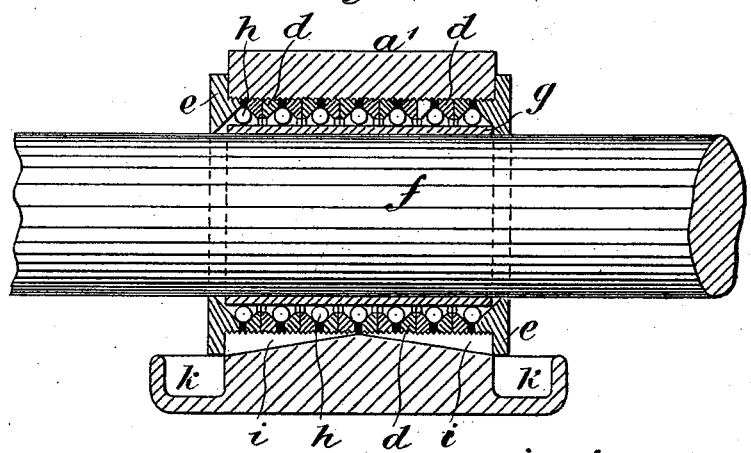
Figure 3:
Figure 4:
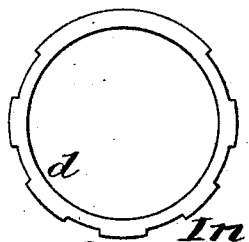

In the accompanying drawings in which similar letters refer to corresponding parts in all the figures:—Figure 1 is an end view of a ball bearing constructed according to my invention. Fig. 2 is a sectional side elevation of the same on line 1—2 Fig. 1. Figs. 3 and 4 are detached views illustrating one of the ball races or rings in edge and face view.

$a$ is the outer casing or casting of the bearing which is divided at $b$ the divided portions being held together by the bolts $c\ c$.

$d\ d$ are the ball races or rings each race or ring being provided with an interrupted peripheral screw thread as clearly shown in Figs. 3 and 4. The interior of the casing or casting $a$ is provided with a correspondingly interrupted screw thread. Consequently any ball race can at once be slipped to its desired place in the casing $a$ and retained there by a partial turn and can be removed when desired with equal facility.

$e\ e$ are oil caps or covers at each end of the bearing for preventing the escape of oil. In Fig. 1 the oil cover is omitted in order to show clearly the interrupted screw thread of the casing $a$.

$f$ represents a shaft or axle carried by the bearing and $g$ is the usual hardened steel sleeve surrounding the same.

The adjustment of the bearing is effected by removing the cover $a'$ thereof when the edges of the ball races being exposed they can be easily turned and adjusted by a chisel, punch, or like handy tool applied to the angles formed by the interruptions in their peripheral screw threads. The cap or cover $a'$ is then replaced and the bolts $c\ c$ tightened up again thereby gripping the ball races $d$ firmly in their adjusted position. The division $b$ of the bearing being considerably above the center line thereof the ball races $d$ will be firmly held and cannot be accidentally displaced even when the cap $a'$ is removed. $d'$ indicates a small notch or groove formed in each ball race $d$ for facilitating the insertion of the balls $h$ when assembling the bearing.

In order to readily collect and avoid loss of the balls when taking the bearing apart I may form an inclined channel or groove $i$ in the bottom of the casing $a$ said channel $i$ terminating at each end of the bearing in a pocket $k$. When the bearing is taken apart the balls released from their races will fall into the channel $i$ and collect in these pockets. If desired the channel $i$ may incline in one direction only, a single pocket $k$ being provided at one end of the bearing.

It will be noted that there is no interruption in the screw thread of the casing which corresponds with the long uninterrupted portion of the screw thread on the ball races, (see Fig. 4,) the corresponding interruption in the screw thread of the casing being produced by removing the cover $a'$ thereof. The effect of this arrangement is that when the cover $a'$ is in place none of the ball races $d$ can possibly slip along the bearing no matter what their position, some portions of their screw threads always interlocking with the thread of the bearing.

In assembling or taking apart the bearing the cap or cover $a'$ must always first be removed.

What I claim, and desire to secure by Letters Patent of the United States, is—

1. In combination in a ball bearing, the casing having the interrupted screw thread on the interior thereof, the balls, and the rings upon which said balls bear, said rings being arranged in the casing and having interrupted screw threads engaging the threads of the casing, substantially as described.

2. In combination in a ball bearing, the divided casing having an internal interrupted screw thread, the plurality of rows of balls and the rings upon which the balls bear, said rings being arranged in the casing and having interrupted screw threads, substantially as described.

3. In combination in a ball bearing, the casing having the internal interrupted screw thread, the balls and the rings upon which said balls bear arranged within the casing and having corresponding interrupted screw threads and notches $d'$ substantially as described.

4. In combination in a ball bearing, the casing with the interrupted screw threads on the interior thereof and the rings forming the races for the balls and having corresponding interrupted screw threads, said casing having the channels for the discharge of the balls and the pocket for receiving the balls, substantially as described.

5. In combination, in a ball bearing, the casing $a$ having the interrupted screw threads on the interior thereof, the removable cover $a'$, the rings $d$ forming races for the balls and having corresponding interrupted screw threads, said rings having also the notches $d'$ and said casing having the inclined channel and the pocket for receiving the balls, substantially as described.

6. In combination in a ball bearing, the casing having the interrupted internal threads, the removable cap having an uninterrupted thread, the balls and the rings within the casing having interrupted threads corresponding to the thread of the casing, substantially as described.

In testimony whereof I have signed my name to this specification, in the presence of two subscribing witnesses, this 2d day of April, A. D. 1894.

WILDSMITH BADGER.

Witnesses:
 A. E. ALEXANDER,
*Chartered Patent Agent,* 19 *Southampton Bldgs., London, W. C.*
 A. O. MORGAN,
*Clerk to above.*